(12) United States Patent
Hauschild et al.

(10) Patent No.: US 6,984,093 B1
(45) Date of Patent: Jan. 10, 2006

(54) SHAFT TOOL WITH FIXEDLY DISPOSED WINGLIKE INSERTS

(75) Inventors: Rüdiger Hauschild, Naundorf (DE); Bertram Hentschel, Trebsen (DE); Ralf Wagner, Kesselsdorf (DE); Detlev Gantner, Freiberg (DE)

(73) Assignee: Actech GmbH Advanced Casting Technologies, Freiberg (DE)

( * ) Notice: Subject to any disclaimer, the term of this patent is extended or adjusted under 35 U.S.C. 154(b) by 0 days.

(21) Appl. No.: 10/019,749

(22) PCT Filed: Jun. 7, 2000

(86) PCT No.: PCT/DE00/01888

§ 371 (c)(1),
(2), (4) Date: Dec. 21, 2001

(87) PCT Pub. No.: WO01/00351

PCT Pub. Date: Jan. 4, 2001

(30) Foreign Application Priority Data

Jun. 24, 1999  (DE) ................................. 199 28 840

(51) Int. Cl.
    *B23C 5/10*    (2006.01)
(52) U.S. Cl. .............................. 407/53; 407/54; 407/56
(58) Field of Classification Search ................. 407/53, 407/54, 56, 61, 62; 366/325.92; 164/17, 164/70.1, 262
    See application file for complete search history.

(56) References Cited

U.S. PATENT DOCUMENTS

| 221,099 A | * | 10/1879 | Putnam ...................... 366/247 |
| 638,504 A | * | 12/1899 | Galt ...................... 366/325.92 |
| 717,531 A | * | 1/1903 | Beynon ...................... 366/247 |
| 1,303,333 A | * | 5/1919 | Lambert ...................... 366/247 |
| 2,621,548 A | * | 12/1952 | Williams ...................... 408/233 |
| 2,637,537 A | * | 5/1953 | Arthur ...................... 416/185 |
| 3,261,095 A | * | 7/1966 | Nelson et al. ...................... 30/169 |
| 3,540,315 A | * | 11/1970 | Freitag ...................... 76/107.1 |
| 4,034,452 A | * | 7/1977 | Edming ...................... 407/54 |
| 4,060,335 A | * | 11/1977 | Holloway et al. .......... 408/233 |
| 4,116,579 A | * | 9/1978 | Hamilton ...................... 408/233 |
| 4,243,348 A | * | 1/1981 | Paige ...................... 408/186 |
| 4,541,757 A | * | 9/1985 | Reynolds et al. ............. 407/53 |
| 4,623,285 A | * | 11/1986 | Costil ...................... 407/41 |
| 4,924,444 A | * | 5/1990 | Castellanos ................. 366/343 |
| 5,222,842 A | * | 6/1993 | Schweikert et al. .......... 407/53 |

(Continued)

FOREIGN PATENT DOCUMENTS

DE          197 21 900 A1    12/1998

*Primary Examiner*—Boyer D. Ashley
*Assistant Examiner*—Dana Ross
(74) *Attorney, Agent, or Firm*—George W. Neuner; Edwards & Angell LLP

(57) ABSTRACT

A shank-end tool is described that is simple and economical to manufacture, with permanently attached wing-like inserts for the milling-type machining of chipless materials that remains functional with unavoidable frictional wear and with increasing erosion. The shank-end tool is characterized by a shank (1) rotatable around its longitudinal axis (2) that can be connected detachably to a drive device and is provided at its free end section (6) with at least one groove-shaped recess (7) extending in the axial direction and one flat cutter blade (8), which is provided with a non-cutting blade edge (12) on its leading face viewed in the direction of advance (9). The shank-end tool is used for the manufacture of molds, especially heat-resistant casting molds for the production of metal castings.

9 Claims, 2 Drawing Sheets

U.S. PATENT DOCUMENTS 5,597,269 A * 1/1997 Ogawa .................. 407/54
5,653,536 A * 8/1997 Mandel ................. 366/285
6,071,045 A * 6/2000 Janness ................. 407/42
6,116,831 A * 9/2000 Simson et al. ........... 409/178
6,146,059 A   11/2000 Rohr .................... 407/40
6,305,832 B1 * 10/2001 Huang .................. 366/129

* cited by examiner

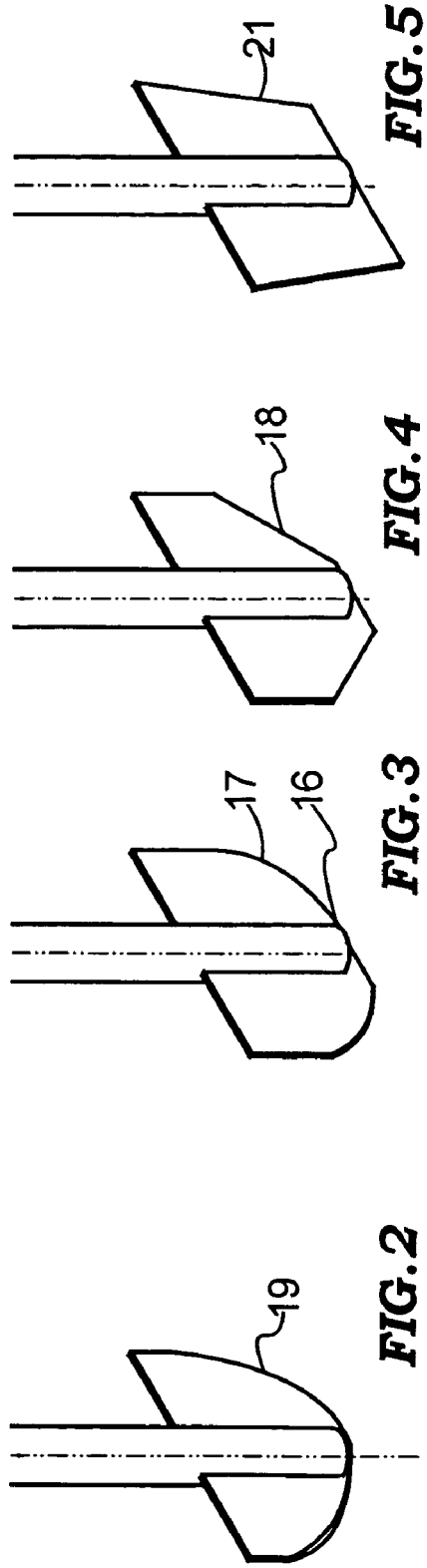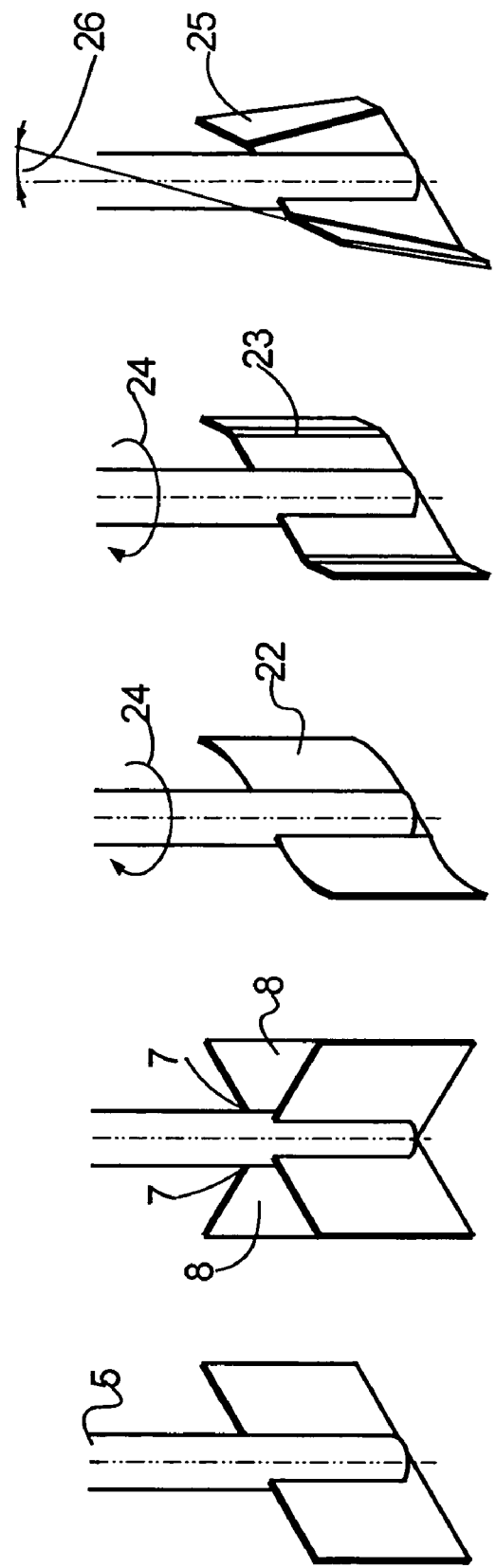

SHAFT TOOL WITH FIXEDLY DISPOSED WINGLIKE INSERTS

BACKGROUND OF THE INVENTION

This invention relates to a shank-end tool with permanently attached wing-like inserts for the milling-type machining of chipless materials for the manufacture of molds, especially heat-resistant casting molds for producing metal castings.

Primarily sand molds that are made with the help of patterns are used in practice to produce metal castings. Since it is costly to make patterns, there has long been a need to make casting molds by direct machining of heat-resistant molding compositions for small and medium-sized runs.

In DE PS 26 05 687 C3, a cutting and milling tool is used to hollow out a mold cavity to produce sand molds, which is used in active combination with a duplicating miller. The milling tool has a knife assembly with a cutter that conforms essentially to an inverted T-shape and is fastened to an arm that rotates around an axis of rotation. The cutter is interchangeable, it is curved on the outside to smooth the mold surface according to the inside diameter of the casting mold to be produced, and viewed in the direction of rotation it is shaped on the forward edge so that a cutting edge is formed. A hardenable green sand with low strength of 2–5 $kg/cm^2$ compacted in a molding box is hollowed out with the cutter before the final strength of the molding sand after hardening is reached. This is to prevent fast wear of the cutting edge. The method is relatively difficult to perform because the proper time for the machining has to be provided for during the hardening of the mold. Otherwise the mold becomes dirty with low-strength molding sand, or the cutter quickly becomes unusable with high-strength sand. Furthermore, the milling tools can be used only to make rotationally symmetrical parts.

On the other hand, it was proposed in DD 275 419 A1 to work out a casting mold from a single block of mold material with tools that have no cutter geometry. To produce a cavity in a block of mold material, a device is used that includes a rod-shaped driver driven around an axis on which at least two non-rigid or semi-rigid carriers variable in length are guided. Active machining units are fastened to these carriers and are positioned at identical angular graduations on the driver to avoid imbalance. Flat parts such as triangular plates, stars, or the like, or balls or squares or others with or without edges can be used as active machining units, for example. Cables, wire cables, sheet metal strips, chains, or the like can be used as non-rigid or semi-rigid carriers, and are provided with additional guard elements to protect against the wear caused by the eroded sand mold material.

To increase excavating capacity, it is necessary during the machining to achieve the highest possible stiffness of the carriers by arranging the machining units to be movable and having them braced against one another. The device can be run under computer control on the arm of a robot. In the same way, it is also possible to control the device by a CNC machine. To improve the surface of the castings, the inner surfaces enclosing the cavity space are sprayed in a concluding step with a smoothing agent, which has to be distributed evenly over the surface. In this case also, it is a drawback that essentially only molds that differ only roughly from rotationally symmetrical parts can be made. The low surface quality of the castings produced with the casting molds is a drawback that can be attributed to the more or less beating action of the tools.

Shank-end millers that have a circular contour are customary for the production of casting molds. The shank-end miller described in DE 197 21 900 A1 has a cutting plate on the free end that is fastened to the shank with tightening screws. The shank has a plate seat with a threaded bore, with the cutting plate being provided with a drilled hole. However, such fastening runs into problems when the dimensions of the cutting plates are smaller than a minimum size. Therefore, it is difficult to loosen the cutting plate or to fasten it satisfactorily. It is also a drawback that the cutting plate is exposed to high wear from chipless materials. This makes it necessary to change tools constantly, which is associated with correspondingly high cost.

To reduce the tool cost occurring from high wear, an economically manufactured milling tool was proposed in DE 3914074 A1 that has a cylindrical shank and a flat cutter support. The cutter support is provided with cutting edges at its edges farthest from the axis of the shank. There are additional frontal cutting plates on the face of the cutter support. The shank is designed as a borer at one end so that the miller can function as a face mill. The cutters are positioned at the radially terminal outer edges of the cutter support relative to the axis of the shank. The cross section of the milling tool shows an S-shaped profile with the cutting edge pointing in the cutting direction. For this reason the previously described miller can be used only for chip-forming materials. Use is not possible for chipless materials.

Foundry sands containing binders bring about a severe degree of wear of the tool cutters, which is caused by wear of the cutters at the cutting edges and frictional wear on the open surfaces. For this reason there is cutting action only with new tools, and there is thus a time limit for it. The cutter wear is manifested as rounding of the forward edge of the tool, which causes additional frictional wear in the area behind the cutting edge. This frictional wear increasingly erodes the outer surfaces and deforms the tool increasingly toward the rear opposite to the direction of rotation. The energy corresponding to the friction is converted into heat, which can lead to heating of the tool and to more rapidly increasing wear.

The problem underlying this invention is to design a shank-end tool for milling-type machining that is simple and economical to manufacture, in such a way that it remains functional with unavoidable frictional wear and with increasing erosion. The machining action should be retained for a lengthy period of time. The losses from friction should be lowered.

SUMMARY OF THE INVENTION

The problem is solved pursuant to the invention with a shank-end tool with a wing-like cutter blade as a cutter insert that is characterized by a shank (1) rotatable around its longitudinal axis (2) that can be connected detachably to a drive device and is provided at its free end section (6) with at least one groove-shaped recess (7) extending in the axial direction and one flat cutter blade (8), which is provided with a non-cutting blade edge (12) on its leading face viewed in the direction of advance (9). The minimal blade thickness brings about a substantial reduction of friction between the blade edges and the casting mold surface, which not only reduces the erosion of the cutter blade but also increases the working life of the tool. Because of this the tool is particularly suitable for high-speed machining, since it has reduced weight and the cooling of the blade edges is increased at high speeds of rotation.

The proposed shank-end tool is composed of easily made semifinished parts, and it can be made economically in this way, which will be described in detail below with reference to an example of embodiment. Other benefits and refinements of the invention are shown in the following description. Examples of such other benefits and refinements include preferred shank-end tools characterized by the fact that the cutter blade (8) is made as a part punched out of a flat blank made of steel, wear-resistant steel, or a suitable wear-resistant material, and is provided with a blade edge (12) at a right angle to the flat face (11); characterized by the fact that the blade edge (12) and the trailing edge (13) of the cutter blade (8) behind the blade edge (12) viewed in the direction of advance (9) are given a radius or are rounded; characterized by the fact that the cutter blade (8) has the basic form of a square or rectangular blank, and/or is provided on the face with rounding (17) or corners (18) cut at an angle; characterized by the fact that the cutter blade (8) is provided with a circular arc-shaped or conical outer contour; characterized by the fact that the cutter blade (8) is provided with curvature (22) or bending (23) parallel to the longitudinal axis (2), with the convex face of the curvature (22) or of the bend (23) pointing in the direction of rotation (24); characterized by the fact that the cutter blade (8) has shovel-like blade folds (25) that are sloped with a blade angle (26) relative to the longitudinal axis (2), to produce fan-like action; characterized by the fact that the cutter blade (8) is made of a metallic blade material, a high-strength elastically deformable blade material, or a springy blade material; characterized by the fact that the cutter blade (8) has a steel base material and is provided with a wear-protective covering (15) on its leading flat face (11) consisting of a hard substance or a metal composite containing hard substances or a metal alloy containing a hard substance; or characterized by the fact that the shank (1) has a tubular or cylindrical hollow body (5) at least in the area of the cutter blade holder (4).

BRIEF DESCRIPTION OF THE DRAWINGS

The attached drawings show.

DETAILED DESCRIPTION OF THE INVENTION INCLUDING PREFERRED EMBODIMENTS

Figure 1:
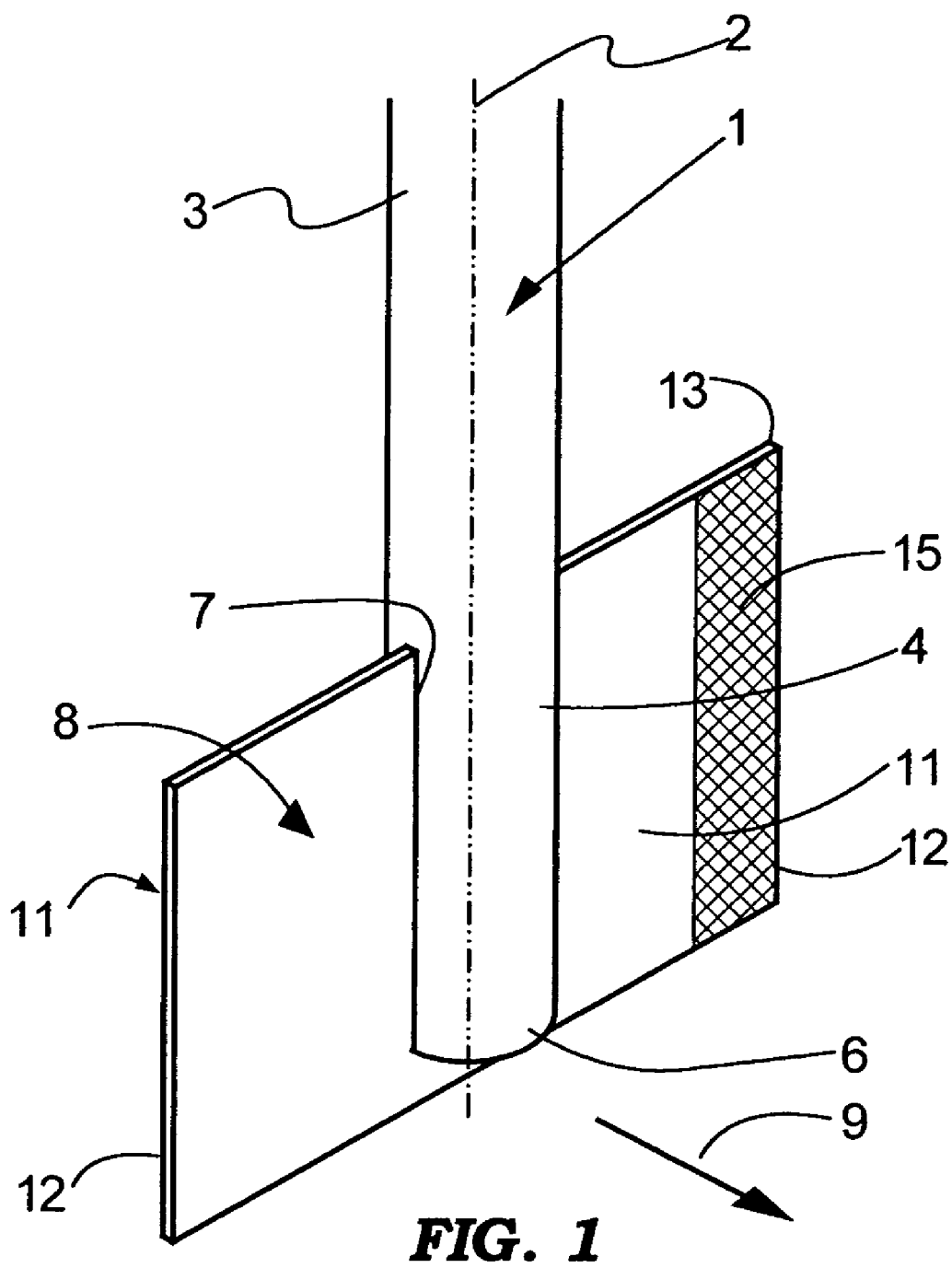
FIG. 1 a shank-end tool with a rectangular cutter blade,
FIG. 2 a shank-end tool with a cutter blade with arc-shaped blade edge,
FIG. 3 a shank-end tool with a cutter blade with rounded blade edges,
FIG. 4 a shank-end tool with a cutter blade with angled blade edges,
FIG. 5 a shank-end tool with a cutter blade with conical blade edges,
FIG. 6 a shank-end tool with a tubular shank,
FIG. 7 a shank-end tool with cutter blades positioned with double symmetry,
FIG. 8 a shank-end tool with a curved cutter blade convex in the direction of rotation,
FIG. 9 a shank-end tool with angled-back cutter blade convex in the direction of rotation,
FIG. 10 a shank-end tool with angled-back cutter blade convex in the direction of rotation with obliquely pitched blade edges in schematic illustration.

The shank-end tool shown in FIG. 1 for the milling-type machining of chipless materials, which may include coarse-crystalline sand particularly in the manufacture of heat-resistant casting molds for metal castings, consists essentially of two simple parts that are assembled in a suitable way, for example by interlocking assembly, welding, soldering, or cementing.

The elongated and cylindrical shank 1 rotatable around its longitudinal axis 2 has an upper shank section 3 that can be connected detachably to a tool holder for rotary cutting tools. According to FIG. 6, the shank 1 is of tubular design with a hollow body 5. A tubular hollow body 5 offers a substantial saving of weight, which becomes a particularly noticeable advantage especially at high speeds of rotation. Another benefit may consist of the fact that the shank 1, at least in the area of the cutter blade mount 4, is designed as a tubular hollow body 5. In this way the hollow body 5 can be lengthened with a fitted cylindrical shank section 3 when machining deep parts.

The shank 1 at its free end section 6 is provided with a groove-shaped recess 7 in the area of the cutter blade mount 4, extending in the axial direction, to hold the cutter blade 8. According to FIG. 7, by way of example, there are two groove-shaped recesses 7 so that two cutter blades 8 can be positioned with double symmetry. In the case of a tubular hollow body 5, the cutter blades 8 can be interlaced with one another by two opposite half cutaways in the longitudinal axis 2, and can be fastened in the recess 7 in an especially simple way, for example by soldering. This guarantees a secure mount at high speeds of rotation.

The cutter blade 8 can be produced as a punched part by punching from a flat blank of sheet metal or wear-resistant sheet metal, with the invention not being limited to the mentioned examples of embodiment. Instead, unmentioned suitable materials and semifinished products can also be used, if they are within the scope of the patent claims. In particular, this is true for composite materials, fiber composition materials, or high-strength materials or ceramic or fiber-composite ceramic elements.

The cutter blade 8 according to FIG. 1 is provided with a wear resistant cutting blade edge 12 on the leading flat side 11 viewed in the direction of advance 9, at a right angle to the flat side 11 when a simple punched part is used. In this case the blade thickness can be comparatively small.

The blade thickness can be 0.1 mm–5.00 mm. The blade thickness is preferably 0.2–1.00 mm.

In particular, the blade thickness should be no greater so that the tangential angle of the flank of the leading blade edge 12 is close to or equal to zero.

When high-strength or composite materials are used, the blade edge 12 and the trailing edge 13 behind the blade edge 12 of the cutter blade 8 viewed in the direction of advance 9 are given a radius or are rounded. Frictional heat and wear are reduced by a small tangential angle and by rounding.

Additional reduction of friction in the area of the trailing edge 13 can be achieved with a cutter blade 8 that has a base material of steel and is joined to a high-strength wear-protective covering 15 on the leading flat face 11. Any hard substance or metal composites containing a hard substance, or a metal alloy or composite material containing a hard substance can be provided as the wear-protective covering 15. Wear of the blade edge 12 becomes lower because of the wear-protective covering 15 applied to the leading flat face 11. The trailing edge 13 on the cutter blade 8 made of steel erodes more severely because of its low strength, so that the flank that has low frictional resistance becomes rounded.

The cutter blade 8 can have diverse forms. Thus different shank-end tools can be used in succession when machining casting molds using CNC-controlled machine tools with automatic tool change, so that the production of complicated molds can be substantially simplified. In the basic form, the cutter blade 8 of FIG. 1 and FIGS. 3–10 has a square or rectangular blank. In FIG. 3 the cutter blade 8 is rounded 17 on its face 16, or in FIG. 4 it is provided with corners 18 cut off at an angle on the face.

The cutter blade 8 of FIG. 2 has an outer contour that has the shape of a circular arc 19, and in FIG. 5 a trapezoidal contour 21 can be seen, which produces a cone when rotated around the longitudinal axis 2 of the shank-end tool.

In a particularly beneficial refinement of the shank-end tool, the cutter blade 8 can have convex curvature 22 parallel to the longitudinal axis 2 according to FIG. 8, or in FIG. 9 it can have convex folding 23 in the direction of rotation 24. If the cutter blade 8 is made of an elastically deformable or springy blade material of low thickness, the curvature 22 can be reduced at higher speeds, as in the case of high-speed machining. In this way the tool radius can be kept constant with increasing wear of the cutter blade 8 because of a speed increase. Metal cutter blades 8 that have high wear resistance are especially suitable for this process. Filigree casting molds that have a very smooth mold surface can be manufactured with the shank-end tools shown, using foundry sand.

To eliminate the machining residues formed during the cutting of the material, it is advantageous for the cutter blade 8 to have shovel-like blade bends 25 according to FIG. 10 to produce fan-like action, by providing a blade angle 26 relative to the longitudinal axis 2. The eroded material residues can thus be carried away from the point of machining primarily in the axial direction.

What is claimed is:

1. A method for the milling-type machining of chipless materials for the manufacture of heat-resistant sand molds, said method comprising:
   providing a shank-end tool comprising:
      a shank portion having a longitudinal axis, a first end that can be connected detachably to a drive device and a second end with a groove-shaped recess extending in the longitudinal direction; and
      a blade as an insert tool in the form of a flat bar in said groove and fixedly attached to the shank, said cutter blade having a flat leading face with a leading blade edge in a direction of advance during use,
   wherein the blade has a leading blade edge with at least a portion of the leading edge substantially parallel to said longitudinal axis and the flat bar and is provided with a non-cutting blade edge on the leading face; and
   wherein said leading blade edge is at a right angle to the flat leading face; and
   machining a chipless material with the shank-end tool to provide a finished form.

2. A method for the milling-type machining of chipless materials in accord with claim 1, wherein the flat leading face of the blade is more wear resistant then the rear side of the cutter blade, wherein the blade comprises a steel base material and is provided with a wear-protective covering on the leading flat face, the wear-protective covering being a material selected from the group consisting of a hard substance, a metal composite containing hard substances, and a metal alloy containing a hard substance.

3. A method for the milling-type machining of chipless materials in accord with claim 1, wherein the blade further comprises a trailing edge behind the leading blade edge when viewed in the direction of advance, wherein the blade edge and the trailing edge are rounded.

4. A method for the milling-type machining of chipless materials in accord with claim 1, wherein the flat leading face of the blade has a rounded corner or a corner cut at an angle.

5. A method for the milling-type machining of chipless materials in accord with claim 1, wherein the flat leading face of the blade has an outer contour with a circular arc or conical shape.

6. A method for the milling-type machining of chipless materials in accord with claim 1, wherein the blade further comprises a curved surface having a convex face or a bent surface, parallel to the longitudinal axis, with the convex face of the curved surface or of the bend pointing in a direction of rotation of the shank in use.

7. A method for the milling-type machining of chipless materials in accord with claim 1, wherein the blade further comprises shovel-like blade folds that are sloped with a blade angle relative to the longitudinal axis to produce fan-like action.

8. A method for the milling-type machining of chipless materials in accord with claim 1, wherein the blade comprises a material selected from the group consisting of a metal, a high-strength elastically deformable material, and a springy material.

9. A method for the milling-type machining of chipless materials in accord with claim 1, wherein the shank comprises a tubular or cylindrical hollow body at least at the second end.

* * * * *